H. Skinner.
Calendar Clock.
No. 837. Reissued Oct. 18, 1859.
Fig. 1.
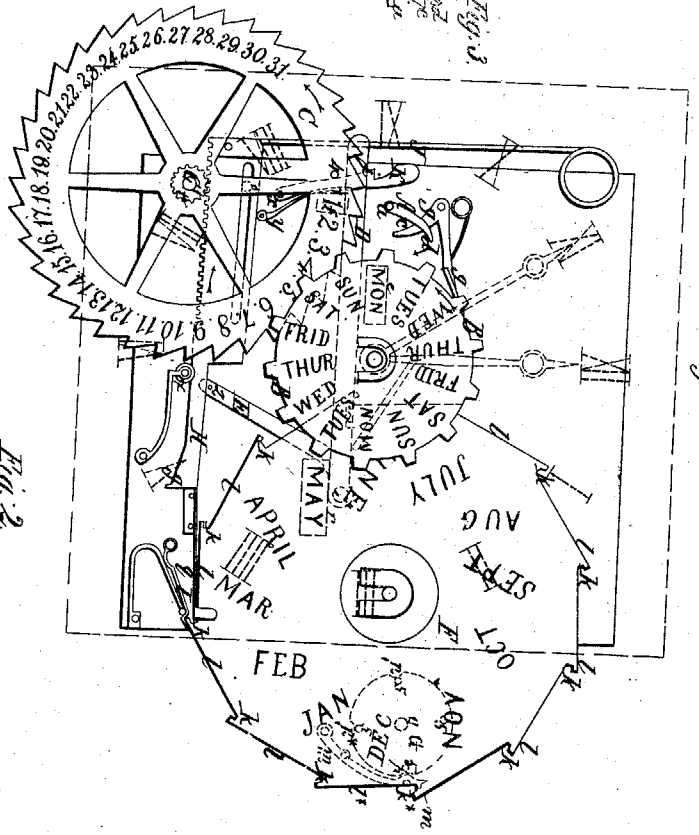
Fig. 3.
Fig. 2.
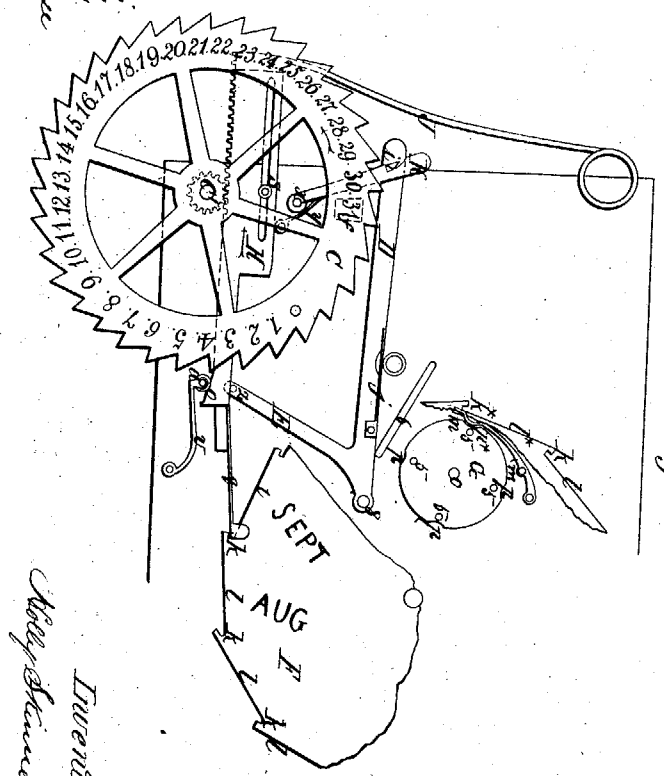
Witnesses;
B. B. Lewis
Jos. Morse
Inventor;
Holly Skinner

UNITED STATES PATENT OFFICE.

HOLLY SKINNER, OF HURON, OHIO.

IMPROVED CALENDAR-CLOCK.

Specification forming part of Letters Patent No. 19,519, dated March 2, 1858; Reissue No. 837, dated October 18, 1859.

*To all whom it may concern:*

Be it known that I, HOLLY SKINNER, of Huron, in the county of Erie and State of Ohio, have invented certain new and useful Improvements in Calendar-Clocks; and I do hereby declare that the following is a full, clear, and exact description of the same, reference being had to the accompanying drawings, forming a part of this specification, in which—

Figure 1 is a front view of the calendar mechanism and the dial of a calendar-clock, the former being shown in black and the latter in red outline. Fig. 2 is a front view of some of the principal portions of the calendar mechanism in a different position, and Fig. 3 is a perspective view of the rotating finger from which the movements of the calendar mechanism are derived.

Similar letters of reference in the several figures indicate corresponding parts.

This invention consists in a calendar-movement of novel description, which effects in a very simple and certain manner all the changes that are rendered necessary by the varying lengths of the months, the year-wheel being provided with an additional tooth controlled by a small leap-year wheel to regulate the effective length of the tooth representing the month of February, and the month-wheel is arranged in such relation to the year-wheel that its motion in one direction is controlled by the length of the different teeth of the year-wheel, and that its motion in the other direction is communicated to the year-wheel; and this invention further consists in arranging the month-wheel in such a manner that the same, at the end of each month, returns to its original position by the action of a spring gathered by the action of the clock-work.

To enable others skilled in the art to make and use my invention, I will proceed to describe it.

A is a finger attached to a spindle, *a*, which is intended to receive one revolution in the direction of the arrow shown near it in Fig. 1 every twenty-four hours, either from the striking-movement of the clock or from the hour-wheel. This finger, whose construction is shown in Fig. 3, and its position relatively to the other parts of the calendar-movement in Figs. 1 and 2, gives motion in the direction of the arrows shown upon them to the toothed wheels B and C, the former of which carries a dial on which is marked the days of the week, and the latter a dial on which is marked numbers from 1 to 31, to represent the days of the months. The week-day wheel B is represented as fitted to rotate on the tube of the hour-hand of the clock, and has fourteen (14) teeth, which may be ordinary spur-teeth, and its dial is divided into a corresponding number of parts marked with the names of the days of two weeks. This wheel, however, may have only seven (7) teeth and have its dial divided into seven (7) parts, marked with the days of one week, and it may be arranged to rotate on a fixed arbor in any convenient position behind the dial of the clock. The month-wheel C has its teeth of ratchet form. It is represented with thirty six (36) teeth; but it may have any number not less than thirty-one, (31.) The numbers on its dial correspond with thirty-one (31) consecutive teeth. It is represented as fitted to rotate loosely on the main arbor C′ of the striking-movement of the clock; but it may be fitted in a similar manner to any fixed axle. The finger A has two teeth, *c* and *d*, (see Fig. 1,) the former of which engages with the teeth of the month-wheel C, and the latter with the teeth of the wheel B, and serving to move each of the said wheels one tooth at each revolution of the finger, and thus to present a new name of day and date of the month opposite to two openings, *e* and *f*, in the clock-dial. The two wheels B and C and the axle *a* are relatively so arranged that the finger A performs the whole of its action upon both wheels during a small fractional portion of its revolution. The teeth *c* of the finger A serves also to release the wheel B from a stop or pawl, *g*, (see Fig. 1,) by throwing the said pawl out of gear before the tooth *d* comes into action on the wheel. The month-wheel C is held stationary between the acts of the finger A upon it by a stud, *i*, attached to the front of one arm of a forked lever, D E, which moves vertically on a fulcrum, 8, secured in the framing of the clock-movement. This stud *i* is caused to drop into the bottoms of the spaces between the teeth by gravitation, aided by a spring, *j*, applied on the top of the lever; but it is lifted over the teeth by the action of the teeth themselves when the wheel is moved by the finger A. F is the gear-wheel, arranged to rotate on a fixed axle, *n*, and having twelve (12) teeth, *l l*, whose form, partaking of the character of ratchet-teeth, is clearly represented in Figs. 1 and 2, their only difference from ratchet-teeth of the common kind consisting in their having notches K K in their faces. These teeth represent the twelve months of the year, and vary in length (measured from the point of each to the back of the notch in the next tooth behind it) in the same ratio as the months, and in the same order. The tooth which represents the month of February (marked *l** in Figs. 1 and 2) is long enough in proportion to the teeth representing the other months to represent the February of a leap-year—viz., twenty-nine (29) days in length; but on the inner side of this tooth there is a spring-tooth, *m*, (shown in dotted lines in Fig. 1, and shown in bold outline in Fig. 2,) which is capable of being forced outward, as shown in Fig. 1, to cover the notch *k** in the tooth behind *l**—viz., the tooth representing the month of January, and thus make the effective length of the tooth *l** bear such relation to the length of the other teeth as to represent twenty-eight (28) days. This spring tooth *m* rests against what may be termed the "leap-year" wheel G, which is arranged to turn freely on a pivot, O, secured in the back of the year-wheel. This leap-year wheel contains four notches, *pppp**, to receive a projection on the back of the spring-tooth *m*, three of the said notches being of such uniform depth that they will support the said tooth when forced outward, as shown in Fig. 1, to cover the notch *k**, and the other one being deeper, and serving as a bearing in which the said tooth may rest in a position to leave the said notch uncovered, as shown in Fig. 2. The elasticity of the tooth *m* is such as to cause it to move toward the center of the year-wheel or to uncover the notch *k**. The year-wheel F carries the month card, which is divided into twelve parts, having the names of the months represented thereon. It may be observed that the positions of these names need not be opposite to the teeth which represent the same months, but will depend upon the position of the opening *r* in the clock-dial, through which the name of the current month is shown.

H is a rack-bar, which is slotted longitudinally to receive and slide along a stationary pin, S, and which is partly supported on a roller, *u*, attached to a spring, *v*, that is secured to the framing of the clock. This bar carries a spring-pawl, *q*, by which the year-wheel is moved one tooth at the end of every month, to present the name of the succeeding month opposite the opening *r* in the clock-dial.

I is a spring-pawl, to prevent the return of the year-wheel when the pawl *q* is moving forward to engage with a new tooth. The rack-bar H derives motion in the direction of the arrow shown upon it from a pinion, *t*, which is attached to the month-wheel C, and which gears into the toothed rack on the under side of the said bar, every daily movement of the said wheel C produced by the finger A, causing the pawl to move a distance bearing a proper proportion to the length of the tooth and to the circumference of the year-wheel. This bar is subjected to the action of a spring, J, which is gathered up or strained as the bar is moved in the direction of the arrow, and at the end of each month it is carried back to its original position by the action of this spring, carrying with it the month-wheel C, which latter is prevented turning back too far by a pin, 4, on its under side, as will be presently explained.

The leap-year wheel receives a quarter revolution on its own axis for every complete revolution of the year-wheel by means of four studs, 5 5 5 5, on its back side, which are arranged equidistantly in a circle described from the center A the said movement being produced by one of the said studs coming in contact with and sliding along a stationary inclined plane or bar, 6, as the leap-year wheel revolves round the axis of the year-wheel.

K is a catch arranged to vibrate near the stud *i* of the lever D E, and between the month-wheel and the lever D E, on a fixed pin, *x*, which is secured in the clock-framing. This catch has a notch on the side next the stud *i* to receive the said stud when the latter is raised high enough out of the notches in the month-wheel. This arm, K, has a spring, *y*, applied to it to force it toward the stud *i*. The arm E of the lever D E carries a pin, Z, which rests upon the top of or nearly touches the rack-bar H when the stud *i* is in one of the notches in the month wheel. The month-wheel is furnished on its back side with a pin, 4, (see Fig. 1,) so arranged that it may strike the catch K in its revolution with the month-wheel.

The operation of the calendar-movement is as follows: At the commencement of the month, when the number 1 is opposite the opening *f*, (as shown in Fig. 1,) the rack-bar H has run out by the spring J as far as it is permitted in the direction in which it moves to turn the year-wheel, its movement in that direction beyond a certain point being prevented by the pin 4 of the month-wheel being in contact with the catch K, and the said catch in contact with a stationary pin, 7, (shown dotted in Fig. 1,) which is secured in the clock-framing. In this condition of the parts the spring-catch I engages one of the teeth of the year-wheel F. At the conclusion of the day the finger A moves both the week-day wheel and the month-wheel in the direction of the arrows shown upon them, as already described, and this is repeated at the end of every day, each movement of the month-wheel producing through the pinion and rack a movement of the rack-bar H and pawl *q* in the direction of the arrow marked on the rack-bar, until the last day of the month, when, the movement of the month-wheel taking place in the usual manner, the point of the pawl *q* is carried past the point of the tooth of the year-wheel, along whose back it has been traveling, and the rack-bar and pawl are lifted by the spring *v* and roller *u*, as shown in Fig. 2. The rack-bar, when thus lifted, raises the stud Z and the lever D E, and thus lifts the stud *i* so high that it is caught in the notch of the catch K, and the month-wheel, then being left entirely under the influence of the action of spring J on the rack-bar and pinion, is by such influence moved quickly back in the opposite direction to the arrow shown on it, to return the figure 1 to the opening *f*, while the pawl *q* moves the year-wheel F far enough to present the name of a new month opposite the opening *r* in the clock-dial. At the same time as this latter operation is completed the pin 4 in the month-wheel strikes the catch K and knocks it away from the stud *i*, to permit the latter to drop into gear again. The month-wheel is prevented moving back too far by the catch K, which is prevented by pin 7 from moving more than just far enough to liberate the stud *i*, and is thus made to serve as a stop to the pin 4. The above movement of the year-wheel is repeated at the end of each month, whether the same consists of twenty-eight, (28,) twenty-nine, (29,) thirty, (30,) or thirty-one (31) days, the liberation of the month-wheel, after the required number of movements, being regulated by the length of the teeth of the year-wheel. Some time in every revolution of the year-wheel F the leap-year wheel is caused to receive a quarter of a revolution on its own axis, by the means hereinbefore described, to regulate the position of the spring-tooth *m* for the next month of February, so that it may cause the effective length of the tooth *l** to be sufficient to provide for twenty-eight (28) or twenty-nine (29) daily movements of the month-wheel, as the year may require.

It might have been before mentioned that the rack-bar H is made with a downward inclination, *g*, on its lower edge, at the end to which the spring-pawl *q* is attached, so as to cause the rack-bar, in running along the roller *u*, to strain the spring *v* just preparatory to the pawl *q* passing the point of each tooth of the year-wheel, but to leave it unstrained during the greater part of the movement of the rack-bar, and to cause a slight descent of the rack-bar. The object of this is to facilitate the movement of the lever D E by the rack-bar to operate the stud *i*. The rack-bar might, however, be made without the inclination *g*, and have the upward pressure of the spring *v* upon it throughout its whole movement, and its rise and fall to operate the lever D E will then be controlled by the teeth of the year-wheel, as it is when made with the inclination *g*.

What I claim as my invention, and desire to secure by Letters Patent, is—

1. The extra movable tooth M and leap-year wheel G, applied to or controlled by the year-wheel F, to operate in the manner described, for the purpose of regulating the effective length of the tooth which represents the month of February.

2. The arrangement of the month-wheel C, its attached pinion *t* and pin 4, the rack-bar H and its pawl *q*, the spring *v* or its equivalent, the lever D E and its stud *i* or their equivalents, the catch K or its equivalent, and the stop 7, the whole being applied to operate upon and be controlled by the year-wheel of a calendar-movement, as and for the purpose herein set forth.

3. Arranging the month-wheel in such a manner that the same at the end of each month returns to its original position by the action of a spring or its equivalent, gathered up or strained by the action of the clock-work, substantially in the manner and for the purpose herein described.

HOLLY SKINNER.

Witnesses:
B. B. LEWIS,
JOEL MORSE.